INVENTOR.
RICHARD J. WOJCIKOWSKI

Nov. 22, 1966  R. J. WOJCIKOWSKI  3,286,801
SYNCHRONIZING CLUTCH WITH MULTIPLE CONICAL DISCS
Filed July 17, 1964  3 Sheets-Sheet 2

INVENTOR.
RICHARD J. WOJCIKOWSKI
BY Walter E. Pavlick
Harold D. Shall
ATTORNEYS

INVENTOR.
RICHARD J. WOJCIKOWSKI
BY Walter E. Pavlick
Harold D. Shall
ATTORNEYS

United States Patent Office 3,286,801
Patented Nov. 22, 1966

3,286,801
SYNCHRONIZING CLUTCH WITH MULTIPLE CONICAL DISCS
Richard J. Wojcikowski, Toledo, Ohio, assignor to Dana Corporation, Toledo, Ohio, a corporation of Virginia
Filed July 17, 1964, Ser. No. 383,282
10 Claims. (Cl. 192—53)

This invention relates to synchronizing clutches in general and more particularly to such a clutch including a friction member.

In the transmissions of automobiles, trucks, tractors and the like, synchronizing clutches are utilized to facilitate clash-free shifting of gears. In one type of synchronizing clutch, a first clutch portion is utilized to provide means for engaging a driving member and a driven member when they are asynchronous and until such time as synchronization occurs. A second clutch portion is utilized to provide means for positively engaging the two members once they have been synchronized by the first clutch means.

Normally, the first clutch portion is of a simple cone or multiple disk type and comprises at least a pair of friction surfaces with a friction member being carried by each of the members and operative to engage each other to frictionally couple the members. Use of truncated cone-shaped friction surfaces has certain advantages over the friction disk type in that the friction surfaces have more leverage as explained below, thereby providing greater coupling torque capability for given frictional surface area. The second clutch portion usually utilizes clutch teeth with at least one set of teeth being carried by each of the members.

With the increased demand for engines producing a higher torque output, the components of the transmissions used in conjunction with such engines have increased in size resulting in an increase in their inertia so that the torque load on the friction surfaces of the synchronizers therein has increased. Further, the gross vehicle weights have also increased considerably leading to the requirement of faster synchronizing and shifting times. Many prior art proposals have been offered to meet these demands; however, these incorporate either friction portions greatly increased in size and/or the engaging force acting on the clutches has been greatly increased.

It is an object of this invention to provide a synchronizing clutch having a friction member of the multiple cone type capable of accommodating high torque loads.

It is another object of this invention to provide in a synchronizing clutch a multiple component friction member which is capable of accommodating high torque loads at relatively low engaging pressures and has minimum space requirements.

It is still another object of this invention to provide a synchronizing clutch having a multiple component friction portion which has the capacity to transfer the system torque requirements within the desired synchronization time.

Another object of this invention is to provide such a friction portion which may be operated at reduced engaging pressure and includes simple automatic means for insuring the disengagement thereof.

Yet another object of this invention is to provide such a synchronizing clutch which is easy to construct, simple to maintain and inexpensive and durable, yet requires a very small amount of space for the installation thereof.

The preferred embodiment of this invention is incorporated in a synchronizing clutch which is operative to frictionally synchronize the speeds of rotation of a pair of relatively rotatable members and then securely couple the same for unitary rotation; the pair of members being a shaft having a gear rotatably mounted thereon. The synchronizing clutch includes a clutch collar splined on the shaft for unitary rotation and axial movement relative thereto and disposed adjacent the rotatable gear. The friction clutch portion of the synchronizing clutch takes the form of a multiple cone friction member carried by the gear and by the clutch collar and operative to be engaged upon movement of the collar toward the gear to a preliminary position for rapidly synchronizing the speeds of rotation of the gear and the collar.

The synchronizing clutch also includes a positive clutch which is also carried by the gear and the clutch collar and takes the form of engageable clutch teeth on the collar and on the gear which becomes engaged upon movement beyond the preliminary position of the collar toward the gear. Preferably, the synchronizing clutch also includes means for maintaining the clutch collar in the preliminary position until the speed thereof and of the gear are substantially synchronized so that the engagement of the clutch teeth will take place without clashing. The clutch also includes means carried by the friction clutch portion and by the gear and clutch collar for insuring the disengagement of the friction clutch.

Further objects and advantages of this invention will appear from a consideration of the following detailed description taken in connection with the accompanying drawings, wherein.

Figure 1:
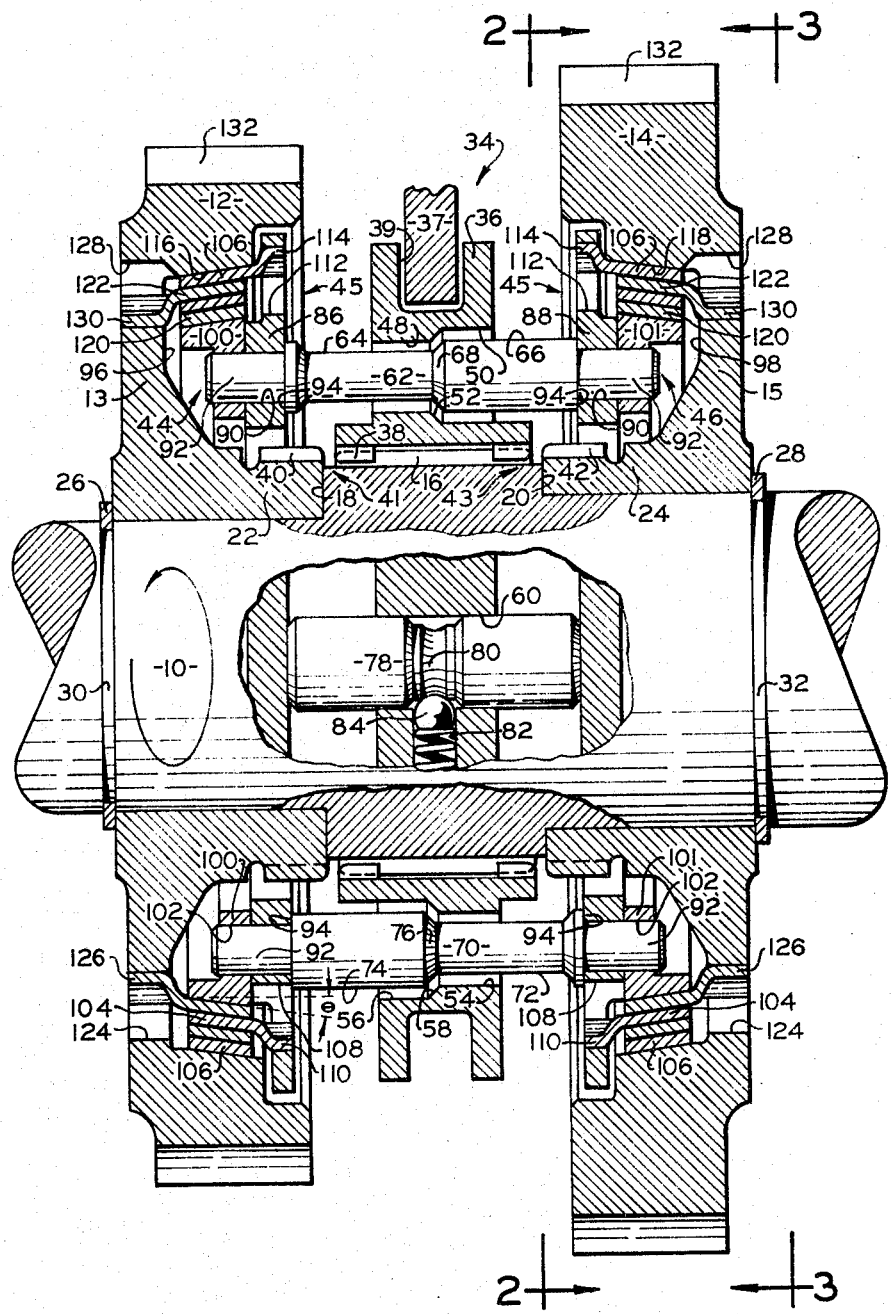
FIG. 1 is a fragmentary longitudinal sectional view of a device embodying the present invention, with the shaft having a central portion broken out and showing a sectional view of the structure behind the shaft.
Figure 2:
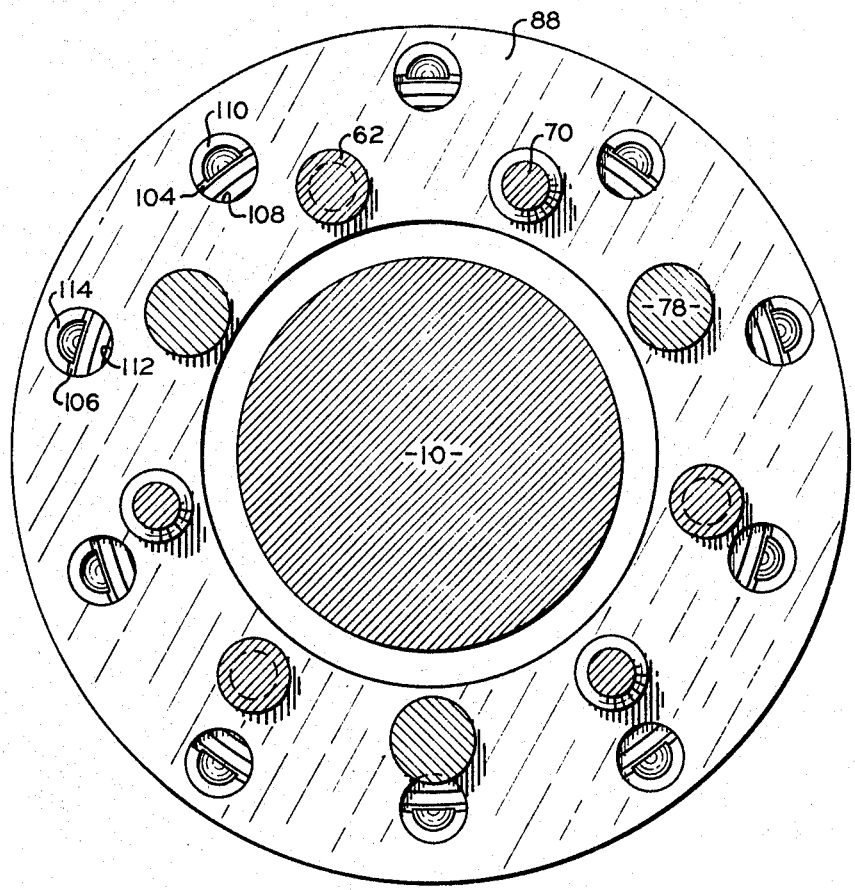
FIG. 2 is a view of the device shown in FIG. 1 taken along the lines 2—2 of FIG. 1 with the gear omitted for clarity.
Figure 3:
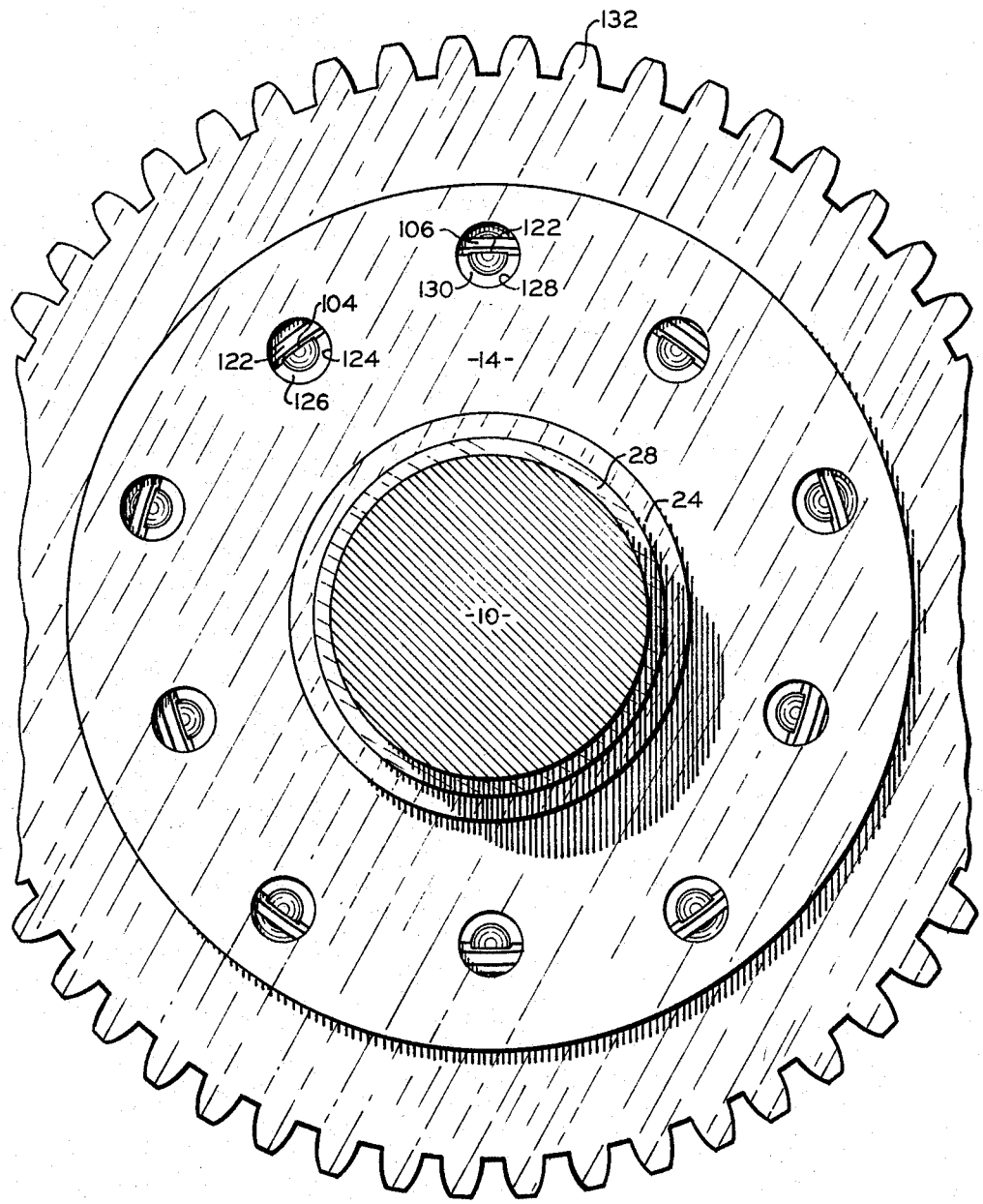
FIG. 3 is a view of the device shown in FIG. 1 taken along the lines 3—3 in FIG. 1.

Referring to the drawings, a shaft 10 has rotatably mounted thereon a pair of axially spaced gears 12 and 14. A splined section 16 of the shaft 10 extends slightly radially therefrom intermediate the gears 12 and 14 and defines end shoulders 18 and 20 which are abutted respectively by the inner faces of hubs 22 and 24 of the gears 12 and 14 and limits the inward movement thereof. A pair of snap rings 26 and 28 are secured in grooves 30 and 32 in the shaft 10 and respectively abut the outer face of the hubs 22 and 24 thereby limiting outward movement of the gears 12 and 14.

A double synchronizing clutch 34 is carried by the shaft 10 and gears 12 and 14. More particularly, a clutch collar 36, positioned intermediate the gears 12 and 14, has internal splines 38 which are splined on the splined section 16 of the shaft 10 so that the collar rotates unitarily with the shaft while being axially movable relative thereto. A shift fork shown fragmentarily at 37 is received in an annular peripheral groove 39 in the clutch collar 36 and is operative to move the latter axially relative to the shaft 10. The inner ends of the hubs 22 and 24 are provided with peripheral splines 40 and 42 respectively which are sized and shaped to cooperatively and clutchingly receive the splines 38 of the clutch collar 36. Accordingly, upon being moved to the right, the splines 38 of the clutch collar 36 remain engaged with the splined section 16 of the shaft 10 and become engaged with the splines 42 of the gear 14 so that the gear 14 and shaft are securely clutched for unitary rotation and torque transfer. Similarly, upon movement to the left of the clutch collar 36, splines 38 remain engaged with the splined section 16 and become engaged with the splines 40 of the gears 12. Thus, the clutch collar 36 and the splines 38 thereon and the splines 40 of the gear 12 constitute a first positive clutch means 41 of the first synchronizing clutch 44 for coupling the gear 12 to the shaft 10 while the collar 36 and the splines 38 thereon and the splines 42 of the gear 14 constitute a second positive clutch means 43 of the second synchronizing clutch 46 for coupling the gear 14 to the shaft 10. It is understood that the gears 12 and 14 have been utilized to illustrate this invention as a double synchronizing clutch 34 comprised of synchronizing clutches 44 and 46; however, either the gear 12 or 14 can be omitted and the synchronizing clutch 44 or 46 of the remaining gear be considered.

The first and second synchronizing clutches 44 and 46 also include a friction clutch means or portion 45. More particularly, the clutch collar 36 has a plurality of axially extending circumferentially spaced openings 48 therein which have an enlarged counterbore 50 at the right end thereof with an angular shoulder 52 formed at the junction of the opening and the counterbore, a second plurality of axially extending circumferentially spaced openings 54 therein alternating with the openings 48, which openings 54 have an enlarged counterbore 56 at the left end thereof with an angular shoulder 58 formed at the junction of the opening and the counterbore, and a third plurality of straight axially extending openings 60.

A blocking pin 62 is received in each opening 48, which pin has a small diameter section 64 substantially smaller than the opening 48 and normally disposed therein, and a larger diameter section 66 which is slightly smaller than the opening 48, and an angular blocking shoulder 68 formed at the junction of the section; the section 66, as shown in FIG. 1, is neutrally disposed in the counterbore 50 but is operative to be received in the opening 48. A blocking pin 70 is received in each opening 54, each pin having a smaller diameter section 72 which is substantially smaller than the opening 54 and normally disposed therein and a larger diameter section 74 which is slightly smaller than the opening 54, and an angular blocking shoulder 76 formed at the junction of the sections; the section 74, as shown in FIG. 1, is neutrally disposed in a counterbore 56 but is operative to be received in the opening 48.

A poppet pin 78 is received in each opening 60 and has an angular poppet receiving groove 80 formed medially therein. The clutch collar 36 has a plurality of poppet openings 82 formed therein with one opening disposed normal to and medially intersecting each opening 60, and a spring loaded ball poppet 84 is disposed in each opening 82 and resiliently engages the groove 80 in the pin 78.

A pair of axially spaced annular plates 86 and 88 are disposed on opposed sides of the clutch collar 36 and each has a plurality of circumferentially spaced openings 90 which register with and pressingly receive the reduced outer end portions 92 of the pins 62 and 70; the end portions 92 extending through the plates 86 and 88 and having a shoulder 94 formed inwardly of the plates against which the latter abut and are limited against inward movement. The plates 86 and 88 are respectively freely received in annular concave depressions 96 and 98 formed in the gears 12 and 14 respectively, which depressions terminate at their axially outer ends at web portions 13 and 15 of the gears 12 and 14 respectively. The axially inner faces of the plates 86 and 88 abut the opposed ends of the poppet pins 78 so that the plates and poppet pins are adapted for unitary axial movement.

A plurality of cooperating, interleaved truncated cone shaped friction elements are carried by the blocking pins 62 and 70 and by the gears 12 and 14 and disposed in the cancave depressions 96 and 98. More particularly, annular pressure plates 100 and 101 are disposed axially outwardly of the plates 86 and 88 respectively and each has a plurality of circumferentially spaced openings 102 which register with and pressingly receive the end portions 92 of the pins 62 and 70; the pressure plates 100 and 101 may be easily formed unitarily with the plates 86 and 88 if desired. The periphery of the pressure plates 100 and 101 are formed as friction surfaces having a truncated conical shape and disposed at a radially inward and axially outwardly disposed angle, indicated at $\theta$, with respect to the axis of rotation. It has been found that the angle $\theta$ should be held between the limits of 7 degrees 30 minutes and 45 degrees, for below these limits the friction elements tend to lock, while above these limits the full benefits of the cone angle are not realized. The plate 86 and the pressure plate 100 form a first pressing means, and the plate 88 and the pressure plate 101 form a second pressing means.

A first and second truncated cone shaped friction element or segment 104 and 106 are carried by each of the plates 86 and 88 and are substantially coaxial and radially aligned with the respective pressure plates 100 and 101, substantially parallel to the periphery of the pressure plates, and radially spaced from each other and the pressure plates with the radial inner and outer surfaces thereof operative as friction surfaces. A first plurality of circumferentially spaced axially extending openings 108 are formed in the plates 86 and 88 and each receives one of a plurality of tangs 110 formed integrally with the friction elements 104 and extending axially inwardly therefrom into registration with the openings 108. A second plurality of circumferentially spaced axially extending openings 112 are formed in the plates 86 and 88 at a greater radius than the openings 108, and each receives one of a plurality of tangs 114 formed integrally with the friction elements 106 and extending axially therefrom into registration with the openings 112. The tanks 110 and 114 are semi-circular in cross section with their arcuate outer surface conforming to the openings 108 and 112 so that they may slide axially relative thereto. Accordingly, the friction elements 104 and 106 rotate unitarily with the plates 86 and 88 and the pressure plates 100 and 101 while being axially movable relative thereto.

The radially outer annular surfaces 116 and 118 of the depressions 96 and 98 respectively are formed as truncated cone shaped friction surfaces and, with respect to the pressure plates 100 and 101 received in the respective depression, are substantially coaxial and radially aligned with the pressure plate and radially spaced from and parallel to the periphery of the pressure plate. A first and a second truncated cone shaped friction element or segment 120 and 122 are carried by each of the gears 12 and 14 and are substantially coaxial and radially aligned with the respective pressure plates 100 and 101 and substantially parallel to the periphery of the pressure plates; the friction element 120 being interposed between the pressure plates 100 and 101 and the friction element 104 and the friction element 122 being interposed between the friction elements 104 and 106, while each of the friction elements 106 is juxtaposed the surface 116 or 118 of the depression 96 or 98 receiving the same. The radially inner and outer surfaces of the elements 120 and 122 are operative as friction surfaces.

A first plurality of circumferentially spaced axially extending openings 124 are formed in the webs 13 and 15 of the gears 12 and 14 and each receives one of a plurality of tangs 126 formed integrally with the friction elements 120 and extending axially outwardly therefrom into registration with the openings. A second plurality of circumferentially spaced axially extending openings 128 are formed in the webs 13 and 15 at a greater radius than the openings 124 and each receives one of a plurality of tangs 130 formed integrally with the friction elements 122 and extending axially outwardly therefrom into registration with the openings. The tangs 126 and 130 are semi-circular in cross-section with their arcuate outer surface conforming to the openings 124 and 128 so that they may slide axially relative thereto. Accordingly, the friction elements 120 and 122 rotate unitarily with the gears 12 and 14 while being axially movable relative thereto.

It should be noted that the friction elements 104, 106, 120 and 122, the pressure plates 100 and 101 and the friction surfaces 116 and 118 of the synchronizing clutches 44 and 46 all respectively lie within the depressions 96 and 98 and are disposed radially inwardly of the teeth 132 of the gears 12 and 14 and within the axial extremities of the teeth, so that a very compact structure is obtained which has a large frictional surface area. By making the friction elements 104, 106, 120 and 122 axially movable relative to the member carrying the same, it is insured that satisfactory full faced frictional engagement will occur between all the friction surfaces when the pressure plates 100 and 101 urge the same into engagement, and that a large surface area of a contact is provided without a great radial size of the friction members and still maintaining them axially within a small confine.

In the embodiment shown in the drawings, the gears 12 and 14 are adapted to be driven counterclockwise, when viewed from the left in FIG. 1, by suitable means such gears driven by a countershaft (not shown), and are operative when clutched to the shaft 10 to drive the latter counterclockwise. However, during the shifting of clutches 44 and 46, the drive to the countershaft (not shown), which in turn is driving the gears 12 and 14, is preferably interrupted by the usual main clutch (not shown), so that, when the main clutch is disengaged and during the portion of the shifting sequence in which the clutches 44 or 46 are being disengaged, the shaft 10 (which usually is connected to the driven means as for example, the driving axle of a vehicle) drives the gear 12 or 14 which is clutched thereto and through the same drives the countershaft (not shown).

The openings 108 and 112 in the plate 86 and the tangs 110 and 114 on the friction elements 104 and 106, while extending axially, are disposed at a slight right hand helix angle or slightly diagonally to the right (when viewed from the left in FIG. 1) so that upon disengagement of the clutch 44, if the friction elements 104 and 106 tend to remain frictionally engaged with the friction elements 120 and 122 and driven counterclockwise by the shaft 10, the tangs 110 and 114 will be urged into the openings 108 and 112 in a screw-like manner thereby moving the elements 104 and 106 to the right and away from the friction elements 120 and 122. Similarly, the openings 124 and 128 in the gear 12 and the tangs 126 and 130 on the friction elements 120 and 122, while extending axially, are also disposed at a slight right hand helix or slightly diagonally to the right (when viewed from the left in FIG. 1). Accordingly, upon disengagement of the clutch 44, as the plate 100 moves to the right, there may be a tendency for the friction elements 104 and 106 to remain engaged with the elements 120 and 122 and against the surface 116 while the plate 100 moves relative to the tangs 110 and 114. However, with the above described arrangement of the tangs and the openings receiving the same, simultaneously with plate 100 moving to the right, the friction elements 104 and 106 move to the right and the friction elements 120 and 122 move to the left in a screw-like manner and complete disengagement of the friction clutch 45 of the synchronizing clutch 44 is insured.

Regarding the friction clutch 45 of the synchronizing clutch 46, the openings 108 and 112 in the plate 88 and the tangs 110 and 114 of the friction elements 104 and 106 received in such openings, and the openings 124 and 128 in the gear 14 and the tangs 126 and 130 on the friction elements 120 and 122 received in said openings, while extending axially, are each disposed at a slight left hand helix angle or slightly diagonally to the left (when viewed from the left in FIG. 1) so that upon disengagement of the clutch 46, the friction elements 104 and 106 and the friction elements 120 and 122 will be urged to the left and right respectively in a screw-like manner and complete disengagement of the friction clutch is insured.

OPERATION

Starting with the clutch collar 36 in its central or neutral position as shown and with the shaft 10 as viewed from the left, moving counterclockwise faster than the gear 12, to clutch the gear 12 to the shaft 10 the clutch collar is shifted to the left by the shift fork 37. The spring loaded poppet 84 engaging the groove 80 in the pin 78 carries the plates 86 and 88 and pressure plates 100 and 101 axially to the left unitarily with the clutch collar. Upon initial engagement of the pressure plate 100 with the friction element 120 and the interengagement of the latter and the friction elements 104, 106 and 122 and the surface 116 of the gear 12, the pressure plate 100 and the plate 86 will retard the blocking pins 62 and 70 while the shaft 10 moves the clutch collar counterclockwise relative to the blocking pins and the shoulders 68 on the pins 62 and the shoulders 52 between the openings 48 and counterbore 50 will blockingly engage each other and thereby inhibit axial movement of the clutch collar to the left relative to the blocking pins and the pressure plate 100. Further movement to the left of the clutch colar 36 will force the pressure plate 100 more securely against the friction element 120 thereby fully engaging the friction clutch portion 45 which will rapidly synchronize the speeds of the gear 12 and clutch collar 36 and, through the spline engagement of the collar with the shaft 10, also synchronize the speeds of the gear 12 and the shaft 10. When this synchronization has been attained, the blocking loads on the shoulders 52 and 68 will be reduced to the point that the clutch collar 36 may move axially relative to the blocking pins 62 from this preliminary blocked position. In moving axially, the clutch collar 36 will cam the ball poppets 84 out of the grooves 80 in the pins 78 and the splines 38 of the clutch collar 36 will clutchingly engage the splines 40 on the gear 12 thereby positively coupling the gear 12 to the shaft 10.

To uncouple the gear 12, the clutch collar 36 is moved to the right which uncouples the splines 38 and 40 of the positive clutch means 41 and, as the poppets 84 engage the groove 80 in the pins 78, the collar moves the pressure plate 100 to the right away from engagement with the friction element 120 and also moving the friction elements 104 and 106 away from the friction elements 120 and 122 and friction surface 116 of the gear 12 so that the friction portion 45 of the synchronizing clutch 44 is entirely uncoupled.

Starting with the clutch collar 36 in its central position, to clutch the gear 14 to the shaft 10, the clutch collar is moved to the right by the shift fork 37. The spring loaded poppet 84 engaging the groove 80 in the pins 78 will carry the plates 86 and 88 and the pressure plates 100 and 101 axially to the right unitarily with the clutch collar. Upon engagement of the pressure plate 101 with the friction element 120 and the interengagement of the latter and the friction elements 104, 106 and 122 and the surface 118 on the gear 14, the pressure plate 101 and plate 86 will retard the blocking pins 62 and 70 while the shaft 10 moves the clutch collar counterclockwise relative to the blocking pins and the shoulders 76 on the pins 70 and the shoulders 58 between the openings 54 and the counterbores 56 will blockingly engage each other and thereby inhibit movement to the right of the clutch collar relative to the pins and the pressure plate 101. Further movement to the right of the clutch collar 36 will force the pressure plate 101 more securely against the element 120 thereby fully engaging the friction clutch portion 45 which will rapidly synchronize the speeds of the gear 14 and the collar 36, and, through the splined engagement of the collar with the shaft 10, also synchronize the speeds of the gear 14 and the shaft. When synchronization has occurred, the blocking loads on the shoulders 58 and 76 will be reduced to the point that the clutch collar may move to the right relative to the blocking pins 70, simultaneously camming the ball poppets 84 out of the grooves 80 in the pins 78, and the splines 38 of the clutch collar 36 will clutchingly engage the splines 42 on the gear 14 thereby positively coupling the gear 14 to the shaft 10. To uncouple the gear 14, the clutch collar 36 is moved to the left which uncouples the splines 38 and 42 of the positive clutch means 43 and, as the poppets 84 engage the grooves 80 in the pins 78, moves the pressure plate 101 to the left away from engagement with the friction element 120 and also moving the friction elements 104 and 106 away from the friction elements 120 and 122 and the friction surface 118 of the gear 14, so that the friction portion 45 of the synchronizing clutch 46 has been entirely uncoupled.

As previously described, the friction portion 45 of the above synchronizing clutches 44 and 46 are provided to synchronize the speeds of two members rotating at different velocities. To accomplish the synchronization, the friction clutch portion 45 must be capable of transferring sufficient torque to bring the rotational velocity of the members into synchronization, this torque being called the system torque requirement and is dictated by at least the inertia of the members and the various drive elements (not shown) drivingly connected thereto. However, not only must the friction clutch portion 45 synchronize these velocities, but it must do so in a relatively short period of time, since the positive clutch 41 or 43 cannot be engaged and the shift completed until synchronization is substantially complete.

Following is a Diagram I which evidences this requirement graphically;

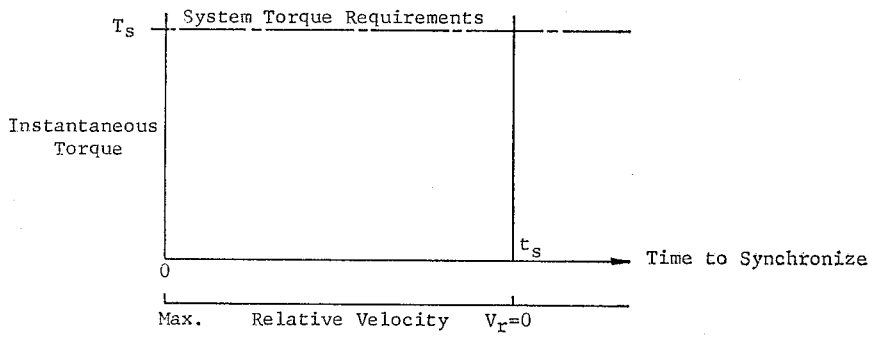

The main base line in the above diagram represents Time to Synchronize starting at 0 at the moment of engagement of the friction surfaces, the vertical distance represents the Instantaneous Torque being transferred by the friction surfaces, while the sub-base line represents the Relative Velocities of the rotating members to be synchronized and starts at a maximum relative velocity at the left. Along this sub-base line, the point $V_r=0$ indicates that the members have a relative velocity of zero and have been synchronized; this point having been indicated on the Time line at a time of $t_s$, which is the preferred maximum time for synchronization. The horizontal dashed line represents the System Torque Requirements (STR) which is determined for the particular system and indicates the torque which will have to be transferred by the friction clutch portion of the synchronizer to attain synchronization. Accordingly, the value indicated at the intersection of the vertical line from the point $t_s$ with the STR line, denotes the torque-time relationship to achieve satisfactory synchronization.

In comparing the multiple disk type synchronizer with the multiple cone type synchronizer as embodied in applicant's invention, the following simplified formula was utilized to determine the torque transfer by the friction members;

$$T = \frac{unpr}{\sine \theta}$$

Wherein:

$T$=torque
$u$=dynamic coefficient of friction
$n$=number of cooperating friction surfaces.
$p$=applied load
$r$=mean radius
$\theta$=angle of the friction surfaces from the axis of rotation Since in the multiple disk synchronizer the angle $\theta$ is 90°, and the sine of 90° is 1.00 and for angles less than 90° the sine becomes progressively smaller as the angle becomes smaller, it is readily apparent that, with all the other factors in the equations remaining constant, a cone-type synchronizer will result in a higher torque transfer than a multiple disk synchronizer, and that the torque transfer will increase as the cone angle decreases. However, it has been found that the full benefits of a multiple cone clutch are not obtained when cone angles $\theta$ above 45 degrees are utilized since the benefit of a pressure angle above 45 degrees and the fact that the radial size is still large is undesirable. Cone angles $\theta$ below 7 degrees 30 minutes are also undesirable since, although great pressure angle and radial size benefits are obtained, the friction elements tend to lock.

In applicant's preferred embodiment, an angle $\theta$ of 10° has been utilized and a family of Torque-Time curves of such a synchronizer with various numbers of friction surfaces $n$ is shown in Diagram II below; the applied load $p$ being selected as the maximum load which an operator can comfortably apply and the mean radius $r$ having been selected so that the Torque-Time curve of one friction surface ($n=1$), shown by the solid line, intersects the STR line at the time $t_s$.

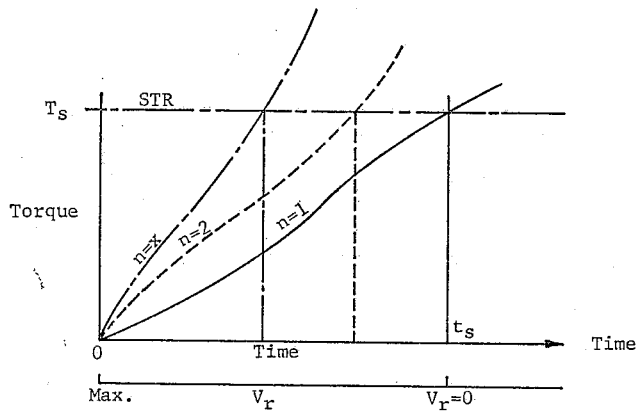

When two ($n=2$) friction surfaces are utilized and all other factors held constant, including the mean radius $r$, it is seen that the Torque-Time curve shown by the dashed line (indicated by $n=2$) crosses the STR line at a time less than $t_s$, and when $x$ friction surfaces are utilized ($x$ equaling a number greater than two), it is seen that the Torque-Time curve, shown by the dash-dot line (indicated by $n=x$), crosses the STR line at a greater time less than $t_s$ than did the lines representing one and two friction surfaces. The capacity of the clutch to transfer more than the STR torque is not detrimental and contributes to the lower time $t_s$ required to reach the STR.

Accordingly, by slightly increasing the number of friction surfaces, the time $t_s$ can be appreciably reduced or, with the increased number of friction surfaces, if desired the applied force $p$ can be reduced so that the time $t_s$ remains constant and the friction surfaces are operating on a lower load resulting in less wear and longer life. Further, if desired, a compromise between applied load and number of friction surfaces can be utilized as for example, utilizing two friction surfaces rather than $x$ friction surfaces and a suitable applied load to result in a time $t_s$.

In Diagram III below, a family of Torque-Time curves of a multiple disk synchronizer having the same operating parameters and number of friction surfaces as shown in Diagram II has been shown.

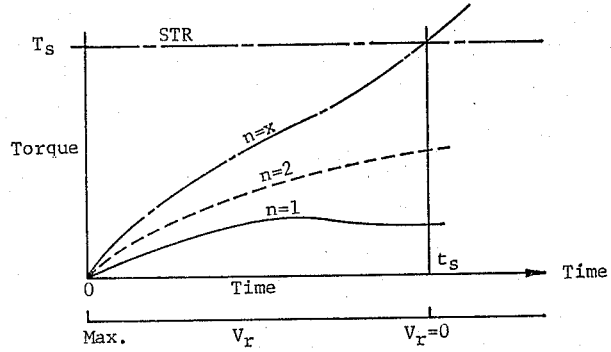

When one friction surface is utilized, as shown by the solid line indicated by $n=1$, the Torque-Time curve does not cross the STR line within the time $t_s$ and apparently will never cross the STR line unless a greater pressure or a greater mean radius is used; however, it is understood, for comparison purposes, that these factors are being held constant. This may be shown by the basic formula, since the sine of a 10° angle is .17, the torque transferred by the cone-type synchronizer will be more than five times as great as the disk type synchronizer, all other factors being equal. When two friction surfaces are utilized, as shown by the dashed line indicated $n=2$, while the torque transferred by the clutch at the time $t_s$ is approximately double that transferred by the solid line $n=1$, the same still does not cross the STR line within the time $t_s$. It is not until $x$ number of friction surfaces are utilized ($x$ being a number greater than 2 and the same as the number utilized and shown in Diagram II as $n=x$), as shown by the dash-dot line indicated $n=x$, that the STR line is crossed at the time $t_s$.

Accordingly, it is seen that with equal numbers of friction surfaces $x$, a multiple cone synchronizer at a 10° cone angle can be operated at a much lower in fact approximately less than one-fifth as much) applied pressure than the multiple disk synchronizer and still synchronize the relative rotating members within the time $t_s$ so that the wear and life thereof is much greater, or, it can be operated at the same applied pressure with fewer friction surfaces and still have the same torque capacity. One of the main problems arising with cone clutches, that is reluctance to disengage, has been solved by disposing the tangs 110, 114, 126 and 130 and the openings receiving the same, helically or diagonally as previously described.

Another important facet to consider is that when disks are added to a multiple disk synchornizer to increase its capacity, its axial size is increased, and the axial size of a synchronizer is prefereably held as small as possible so that the axial size of a transmission containing the same is not increased. With the multiple cone synchronizer, adding members to the synchronizer does not increase its axial size, and with the slight increase in radial size obtained by adding members another advantage is obtained in that the mean radius is increased as the radial size of the assembly is increased; and since the mean radius enters into the calculation of clutch torque capacity, an increase of the mean radius results in an increased torque capacity. This gives further torque transferring advantages over the multiple disk type synchronizer since with the latter, merely adding more disks does not increase the mean radius unless the radial size of the disks are also increased along with the increased axial size of the multiple disk assembly.

While only a single embodiment of this invention has been shown and described, it is readily apparent that many changes can be made therein without departing from the scope of this invention as defined in the following claims.

What is claimed is:

1. A synchronizing clutch for use with a first member coaxially and rotatably mounted relative to a second member and being operative to couple said members for unitary rotation in a torque transferring relationship comprising in combination,
   (a) a shiftable element mounted on said second member for unitary rotation therewith and axial movement relative thereto,
   (b) said element having a neutral position and being shiftable axially toward said first member to a first position and being further shiftable axially toward said first member from said first position to a second position,
   (c) friction clutch means having a first and a second portion frictionally engageable with each other for frictionally coupling said members,
      (1) said first portion being carried by said first member for unitary rotation therewith and said second portion being carried by said element for unitary rotation therewith.
      (2) said portions of said friction clutch means being frictionally engaged upon movement of said element from its neutral position to its first position and being operative when engaged to frictionally synchronize the rotation of said member,
      (3) said portions of said friction clutch means being disengaged upon return of said element to its neutral position,
   (d) releaseable means connecting said second portion and said element for unitary axial movement while said element moves from its neutral position to its first position and for allowing said element to move axially relative to said second portion upon movement from its first position to its second position,
   (e) blocking means for blockingly engaging said element and inhibiting the same from moving from said first to said second position while said members are rotating relative to each other and for allowing said element to move to said second position upon subtantial synchronization of the rotation of said members, (f) positive clutch means having a first and a second coupling portion positively engageable with each other for positively coupling said members,
  (1) said first coupling portion being carried by said first member for unitary rotation and said second coupling portion being carried by said element for unitary rotation,
  (2) said coupling portions being positively engaged upon movement of said element to its second position, (g) characterized in that
  (1) said friction clutch means is a multiple cone clutch, and
  (2) torque responsive means are carried by said first portion and said first member and torque responsive means are carried by said second portion and said element for urging said first and second portions axially apart relative to each other and respectively relative to said first member and said element upon movement of said element from its second to its neutral position.

2. A synchronizing clutch for use with a first member coaxially and rotatably mounted relative to a second member and being operative to couple said members for unitary rotation and in a torque transferring relationship comprising in combination, (a) a shiftable element mounted on said second member for unitary rotation therewith and axial movement relative thereto, (b) said element having a neutral position and being shiftable axially toward said first member to a first position and being further shiftable axially toward said first member from said first position to a second position, (c) friction clutch means of the multiple cone type having first and second portions engageable with each other for frictionally coupling said member, (d) said first portion including
  (1) a first conical friction surface fixed to said first member,
  (2) a first conical friction segment radially spaced from said first conical surface and coaxial therewith and having radially inner and outer engaging faces, and
  (3) first connecting means connecting said first friction segment to said first member for unitary rotation therewith and axial movement relative thereto, (e) said second portion including
  (1) a pressing means having a second conical friction surface disposed thereon, said second friction surface being radially adjacent, coaxial with, and adapted to frictionally engage one of the engaging faces of said first friction segment,
  (2) a second conical friction segment having radially inner and outer engaging faces and being coaxially interposed between said first conical friction surface and said first conical surface and adapted to be compressed therebetween, and
  (3) second connecting means connecting said second friction segment to said pressing means for unitary rotation therewith and axial movement relative thereto, (f) releasable means connecting said pressing means and said element for unitary axial movement while said element moves from its neutral to its first position and connecting the same for unitary rotation and relative axial movement while said element moves from its first to its second position, (g) said pressing means pressing said friction surfaces and said conical segments into frictional engagement upon axial movement unitarily with said element from its neutral to its first position, (h) blocking means carried by said second portion and said element for blockingly engaging said element and inhibiting the same from moving from said first to said second position while said members are rotating relative to each other and for allowing said element to move to said second position from said first position upon substantial synchronization of the rotation of said members, and (i) positive clutch means having a first and a second coupling portion positively engageable with each other for positively coupling said members,
  (1) said first coupling portion carried by said first member for unitary rotation and said second coupling portion being carried by said element for unitary rotation,
  (2) said coupling portions being positively engaged upon movement of said element to its second position, and (j) said first connecting means and said first members, and said second connecting means and said pressing means including torque responsive means for urging said first and second conical friction segments axially apart relative to each other and respectively relative to said first member and said pressing means upon movement of said element from its second to its neutral position.

3. The synchronizing clutch defined in claim 2 wherein
(a) said first connecting means comprises a plurality of means projecting substantially axially from said first friction segment,
(b) said first member has a plurality of axially extending openings therein, and said projecting means being received in and registering with said openings,
(c) said second connecting means comprises means projecting substantially axially from said second conical friction segment,
(d) said pressing means having a plurality of openings extending substantially axially therethrough, and
(e) said second projecting means being received in and registering with said openings in said pressing means.

4. The synchronizing clutch defined in claim 3 wherein
(a) said projecting means and said openings are displaced from the axial straight direction for urging said first and second conical friction segments axially apart relative to each other and respectively relative to said first member and said pressing means in a screw-like manner.

5. A synchronizing clutch for synchronizing the speeds of rotation of a gear rotatably mounted on a shaft and for positively clutching the same for unitary rotation comprising in combination
(a) a shaft,
(b) a gear rotatably mounted on said shaft and including,
  (1) a hub having a central opening therein rotatably receiving said shaft,
  (2) an annular peripheral rim having external gear teeth thereon, and
  (3) a radially extending web portion connecting said hub and said rim and being relatively thin in an axial direction,
(c) said hub and said rim each extending axially from said web solely in the same first direction thereby providing a pair of radially spaced axial extensions defining an annular concave depression bounded by said extensions and said web,
  (1) one of said axial extensions having a first conical friction surface thereon disposed entirely within said depression,
(d) an axially shiftable element carried by said shaft for unitary coaxial rotation therewith and axial movement relative thereto and positioned in said first axial direction with respect to said gear,
(1) said element having a neutral position axially displaced from said gear and being axially movable toward said gear to a first position and further toward said gear from said first to a second position,
(e) friction clutch means for synchronizing the rotation of said gear and said shaft and including first and second engaging portions disposed entirely within said concave depression,
(f) said first portion including a plurality of conical radially spaced and parallel friction segments disposed coaxially with said gear,
(g) means connecting said first friction segments to the web of said gear for unitary rotation therewith and axial movement relative thereto,
(h) said second portion including a pressing means having a second friction surface thereon disposed coaxially with said first friction surface and spaced therefrom and a second plurality of spaced parallel conical friction segments disposed coaxially with said gear and interleaved with said first friction segments,
(i) second connecting means connecting each of said second segments to said pressing means for unitary rotation and axial movement relative thereto,
(j) releasable means connecting said pressing means and said element for unitary axial movement while said element moves from its neutral position to its first position and for allowing said element to move axially relative to said pressing means upon movement to its first position from its second position,
(k) blocking means for blockingly engaging said element and inhibiting the same from moving from said first to said second position while said gear and shaft are rotating relative to each other and for allowing said element to move to said second position upon substantial synchronization of the rotation of said gear and shaft,
(l) positive clutch means having a first and a second coupling portion positively engageable with each other for positively coupling said gear and said shaft,
(1) said first coupling portion being carried by said gear for unitary rotation and said second coupling portion being carried by said element for unitary rotation,
(2) said coupling portions being positively engaged upon movement of said element to its second position.

6. A synchronizing clutch as defined in claim 5 wherein
(a) said first and second connecting means comprise separate means for connecting each of said friction segments to said web and to said pressing member respectively,
(b) said first friction surface is fixedly connected to said gear and said second friction surface is fixedly connected to said pressing means,
(c) said means connecting each of said first friction segments to said web for connecting the same for unitary rotation and relative axial movement and include means for urging said first friction surfaces axially toward said web upon movement of said element from its second to its neutral position, and
(d) said second connecting means connecting said second friction segments to said pressing means for unitary rotation and relative axial movement and include means for urging said second friction segments axially toward said pressing member upon movement of said element from its second to its neutral position.

7. A synchronizing clutch for synchronizing the speeds of rotation of a gear rotatably mounted on a shaft and for positively clutching the same for unitary rotation comprising in combination,
(a) a shaft,
(b) a gear rotatably mounted on said shaft and including,
(1) a hub having a central opening therein rotatably receiving said shaft,
(2) an annular peripheral rim having external gear teeth thereon, and
(3) a radially extending web portion connecting said hub and said rim and being relatively thin in an axial direction,
(c) said hub and said rim each extending axially from said web in the same first direction thereby providing a pair of radially spaced axial extensions defining an annular concave depression bounded by said extensions and said web,
(1) one of said axial extensions having a first conical friction surface thereon disposed entirely within said depression,
(d) an axially shiftable element carried by said shaft for unitary coaxial rotation therewith and axial movement relative thereto and positioned in said first axial direction with respect to said gear,
(1) said element having a neutral position axially displaced from said gear and being axially movable toward said gear to a first position and further toward said gear from said first to a second position,
(e) friction clutch means for synchronizing the rotation of said gear and said shaft and including first and second engaging portions disposed entirely within said concave depression,
(f) said first portion including said first conical friction surface and a plurality of radially spaced first conical friction segments with each of said first segments having radially inner and outer friction surfaces disposed coaxially with said gear and substantially parallel to said first friction surface,
(g) first connecting means connecting each of said first segments to the web of said gear for unitary rotation and axial movement relative thereto,
(h) said second portion including a pressing means having a second conical friction surface thereon disposed coaxially with said first friction surface and adjacent the one of said first segments spaced radially the farthest from said first friction surfaces and a plurality of radially spaced second conical friction segments, each of said second segments
(1) having radially inner and outer friction surfaces disposed coaxially with and substantially parallel to the friction surfaces on said first segment, and
(2) being interleaved between said first friction surface and the segments of said plurality of first segments,
(i) second connecting means connecting each of said second segments to said pressing means for unitary rotation and axial movement relative thereto,
(j) releasable means connecting said pressing means and said element for unitary axial movement while said element moves from its neutral position to a first position and for allowing said element to move axially relative to said pressing means upon movement from its first position to its second position,
(k) blocking means for blockingly engaging said element and inhibiting the same from moving from said first to said second position while said gear and shaft are rotating relative to each other and for allowing said element to move to said second position upon substantial synchronization of the rotation of said gear and shaft,
(l) positive clutch means having a first and second coupling portion positively engageable with each other for positively coupling said gear and shaft,
(1) said first coupling portion being carried by said gear for unitary rotation and said second coupling portion being carried by said element for unitary rotation,
(2) said coupling portions being positively engaged upon movement of said element to its second position.

8. A synchronizing clutch according to claim 7 wherein
(a) said first connecting means comprises a plurality of means projecting substantially axially from said first friction segments,
(b) said gear has a plurality of axially extending openings formed in the web thereof, and said projecting means being received in and registering with said openings thereby connecting said friction segments to said gear for unitary rotation and relative axial movement,
(c) said second projecting means comprising means projecting substantially axially from said second conical friction segments,
(d) said pressing means having a plurality of openings extending substantially axially therethrough, and
(e) said second projecting means being received in and registering with said openings in said pressing means thereby connecting said second friction segments to said pressing means for unitary rotation and relative axial movement.

9. A synchronizing clutch according to claim 8 wherein
(a) said projecting means and said openings are displaced from the axial straight direction for urging said first and second conical friction segments axially apart relative to each other and respectively relative to said gear and said pressing means in a screwlike manner.

10. A synchronizing clutch for synchronizing the speeds of rotation of a gear rotatably mounted on a shaft and for positively clutching the same for unitary rotation and comprising in combination,
(a) a shaft,
(b) a gear rotatably mounted on said shaft and including
(1) a hub having a central opening therein rotatably receiving said shaft,
(2) an annular peripheral rim having external gear teeth thereon, and
(3) a radially extending web portion connecting said hub and said rim,
(c) a shiftable element mounted on said shaft for unitary rotation therewith and axial movement relative thereto,
(1) said element having a neutral position axially displaced from said gear and being axially movable toward said gear to a first position and further toward said gear from said first to a second position,
(d) friction clutch means of the multiple cone type having first and second portions engageable with each other for frictionally coupling said member,
(e) said first portion including,
(1) a plurality of conical, radially spaced and parallel friction surfaces disposed coaxially with said gear,
(f) first means connecting said first friction surfaces to said gear for unitary rotation therewith and axial movement relative thereto,
(g) said second portion including a pressing means and a second plurality of radially spaced parallel conical friction surfaces disposed coaxially with said gear and interleaved with said first friction surfaces,
(h) second connecting means connecting said second friction surfaces to said pressing means for unitary rotation and axial movement relative thereto, said first and second connecting means being responsive to torque transferred between said gear and pressing means for wedging said surfaces axially apart relative to each other,
(i) releasable means connecting said pressing means and said element for unitary axial movement while said element moves from its neutral position to its first position and for allowing said element to move axially relative to said pressing means upon movement to its first position from its second position,
(j) blocking means for blockingly engaging said element and inhibiting the same from moving from said first to said second position while said gear and shaft are rotating relative to each other and for allowing said element to move to said second position upon substantial synchronization of the rotation of said gearing shaft,
(k) positive clutch means having a first and a second coupling portion positively engageable with each other for positively coupling said gear and said shaft,
(1) said first coupling portion being carried by said gear for unitary rotation and said second coupling portion being carried by said element for unitary rotation,
(2) said coupling portions being positively engaged upon movement of said element to its second position.
(l) said conical friction surfaces being disposed at an angle from 7 degrees 30 minutes to 45 degrees with respect to the axis of rotation of said gear.

References Cited by the Examiner

UNITED STATES PATENTS

| | | | |
|---|---|---|---|
| 1,043,406 | 11/1912 | Denio | 192—52 |
| 2,573,613 | 10/1951 | Schultz | 192—53 |

FOREIGN PATENTS

| | | |
|---|---|---|
| 698,868 | 10/1953 | Great Britain. |
| 899,349 | 6/1962 | Great Britain. |

DAVID J. WILLIAMOWSKY, *Primary Examiner.*

B. W. WYCHE III, *Assistant Examiner.*